June 20, 1950  V. A. NARDI  2,511,989
BAND SAWING MACHINE WITH ADJUSTABLE ANGLE OF CUT
Filed July 5, 1946  2 Sheets-Sheet 1

Inventor:
Vito A. Nardi
By
Albert I. Kegan
Atty

Patented June 20, 1950

2,511,989

UNITED STATES PATENT OFFICE 2,511,989

BAND SAWING MACHINE WITH ADJUSTABLE ANGLE OF CUT

Vito A. Nardi, Chicago, Ill.

Application July 5, 1946, Serial No. 681,467

1 Claim. (Cl. 143—21)

The present invention relates to improvements in band sawing machines, and more particularly to a band sawing machine which incorporates means for adjusting the angle of cut in the work without tilting the work supporting table.

My sawing machine is of the type wherein an endless saw band is extended over a plurality of guide wheels, one or more of which also transmits power to drive the band past the work. Ordinarily, in such a machine, the cutting reach of the band extends vertically to the horizontally supported work; but frequently it is desirable to make a kerf in said work at an angle other than 90° to the horizontal. Previous devices in the art have provided tiltable work tables for accomplishing such angled kerfs, but it is evident that such expedients are clumsy and impractical to use in that tilting the work table robs said table of its value as a work support. The tendency of the work to slide off a tilted table makes it difficult for the operator to follow the selected line of cut, and also brings the work to bear upon the side of the band, thereby imposing additional strain thereupon and increasing the frequency with which the band breaks.

In my invention, I provide a simple, yet practical and efficient, means for pre-selecting the angle of inclination of the kerf without displacing the work table from its steady horizontal position. I accomplish this by translating the carrier wheels at the ends of the cutting reach of the band to adjust said wheels in horizontally spaced relationship to each other. Thus, when the line of centers of said wheels is vertical, the cutting reach of the saw band is vertical with respect to the work table, and when the line of centers of said wheels is inclined to the left or the right, said cutting reach is equally inclined to the left or right. This inclination may be increased or diminished to the exact degree desired simply by increasing or decreasing the horizontally spaced relationship of the carrier wheels.

The translatable feature of the aforesaid carrier wheels in my invention also permits of greatly increased economy in the operation of band sawing machines. A principal item of expense involved in working such a machine lies in the replacing of saw bands which quite frequently snap during operation of the machine. The broken bands may be welded and used again, but the machine must be capable of accommodating itself to the shorter length of the repaired band. Another consideration lies in the original cost of new saw bands. For example, the price of an 125" band is approximately three times that of an 85" band. The employment of the longer bands is frequently unavoidable with large pieces of work, but the majority of operations may generally be accomplished with the more inexpensive, shorter saw bands. It is obvious that a band sawing machine which is adapted equally as well to the service of an 85" band as to the use of an 125" band may be operated far more economically than a machine which is not so versatile and which therefore must always employ the longer, more expensive bands in order to accommodate the larger sized pieces of work. Previous band-saws have generally been designed for specific lengths of saw bands and have permitted of only limited adjustment in said lengths by providing tensioning means for the band. On the other hand, as will hereinafter become apparent, in a band-saw incorporating my invention, the length of saw band may be pre-selected as the shortest, and therefore the most economical, band which can be employed according to the size and the specifications of the work at hand.

A principal object of my invention, therefore, is to provide a band sawing machine including means for adjusting the angle of cut in the work without tilting the work supporting table.

Another important object of my invention is to provide a band sawing machine which is adaptable to the service of saw bands varying greatly in length.

Still other objects of my invention are to provide an improved band sawing machine which is compact, efficient, safe and simple to operate, and which is constructed to permit the feeding thereto of relatively large pieces of work.

The foregoing and such other advantages, objects and capabilities as may appear herein or be pointed out as this description proceeds, or as are inherent in the present invention, are illustrated in the accompanying drawings depicting a preferred embodiment of my invention, and in which.

Like reference characters are used to designate similar parts in the drawings and in the description of invention which follows.

Figure 1:
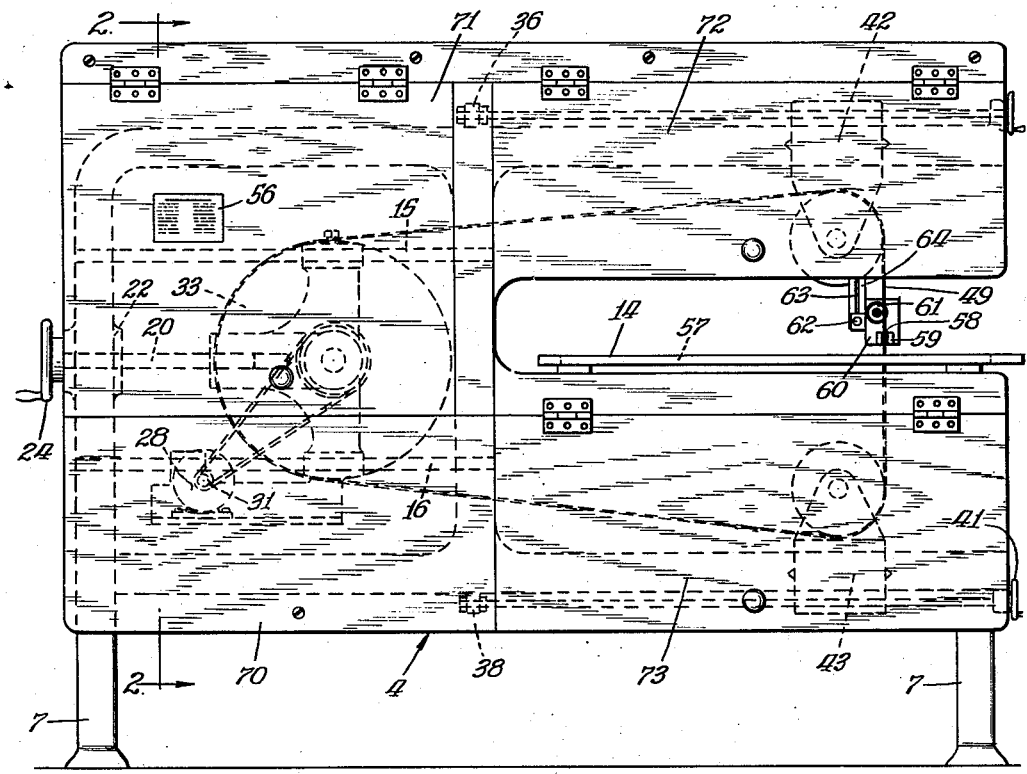
Figure 1 is a front elevation of a band sawing machine incorporating my invention.

The band sawing machine 4 is built upon the frame 5 which includes a base 6, a plurality of leg members 7, a pair of horizontally spaced struts 8 and 9, and a pair of vertically spaced struts 10 and 11 which extend laterally into the vertically spaced arms 12 and 13. A horizontal work table 14 is supported by the frame 5 between the arms 12 and 13.

Figure 3:
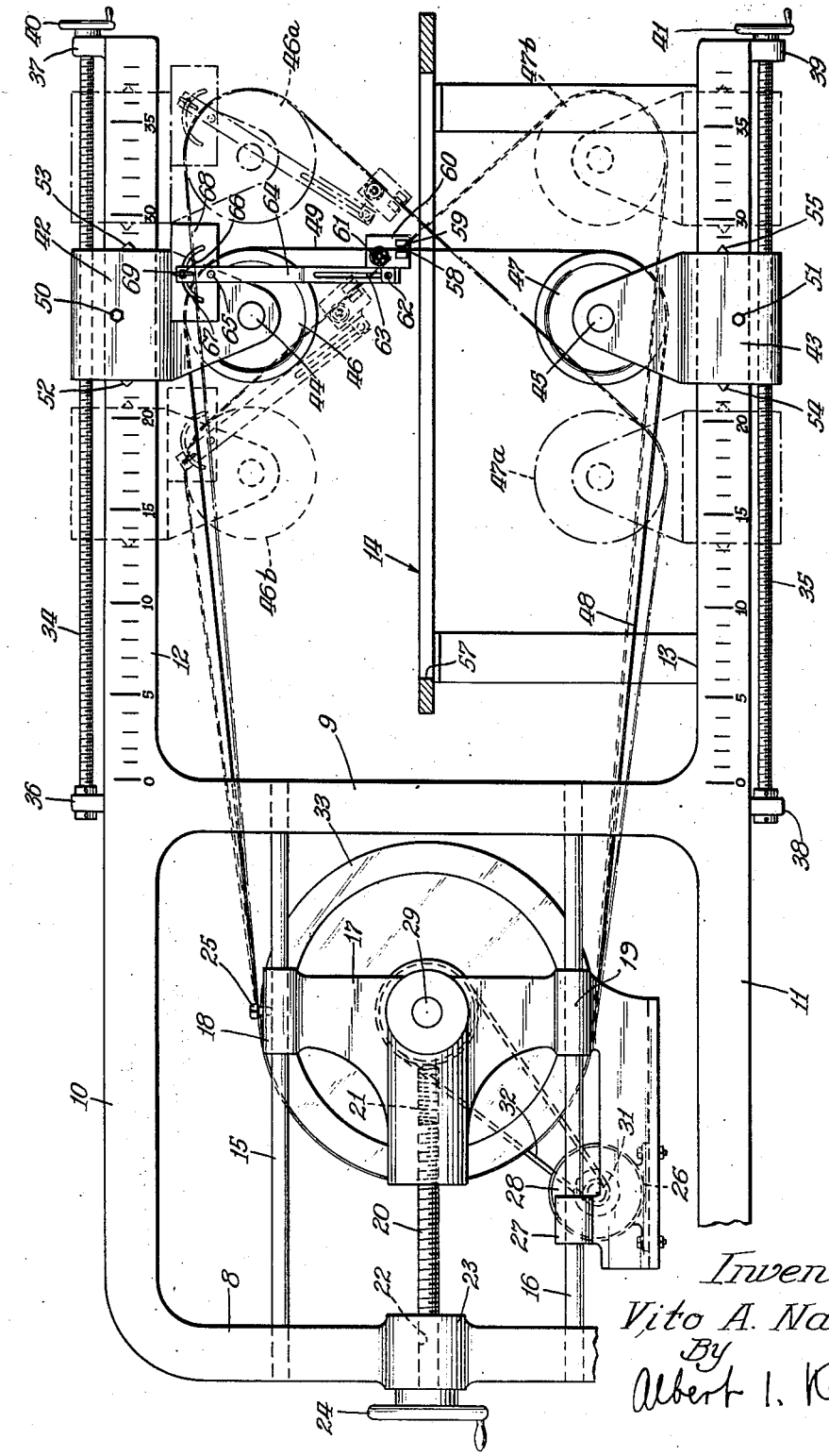
Figure 3 is a front elevation of the same machine illustrated in Figure 1 with part of the frame broken away and the cabinet removed to reveal the interior construction and cooperation of parts.

To one side of work table 14 are positioned a pair of horizontal, vertically spaced guide rods 15 and 16 fastened at the ends thereof in the vertical struts 8 and 9 (Figure 3). A cross-head 17 is journaled upon the rods 15 and 16 at bearings 18 and 19 respectively. These bearings 18 and 19 are adapted to slide upon said rods 15 and 16, thereby translating the cross-head 17 with respect to the work table 14. A horizontal, threaded shaft 20 is engaged in a threaded tap 21 in the cross-head 17 and said shaft 20 is journaled in the bore 22 of the boss 23 formed upon the strut 8. A handwheel 24 is keyed to the end of the shaft 20 remote from the cross-head 17. It is apparent that rotation of the handwheel 24 will translate the cross-head 17 along the guide rods 15 and 16. A set screw 25 is provided to secure the cross-head 17 in a selected position along said guide rods 15 and 16.

Figure 2:
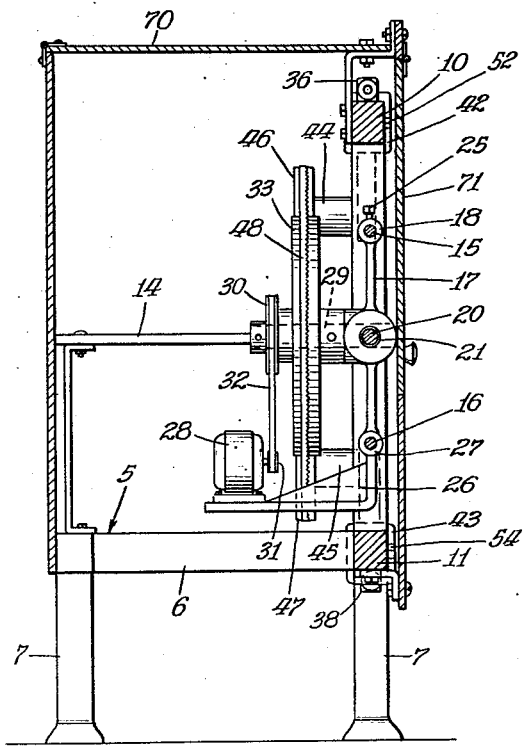
Figure 2 is a view in vertical section taken on the line 2—2 of Figure 1.

An angle bracket 26 (Figures 2 and 3) depends from the cross-head 17 at the bearing 18 and is slidably supported upon the guide rod 15 by said bearing 18 and an auxiliary bearing 27. An electric motor 28 is bolted to the bracket 26. A drive shaft 29 is journaled in the cross-head 17 and said drive shaft 29 is rotated by the electric motor 28 through the sheaves 30 and 31 and the V-belt 32. The rotation of the drive shaft 29 turns the large drive wheel 33 keyed upon said shaft 29.

A pair of horizontal threaded shafts 34 and 35 (best illustrated in Figure 3) are fastened along the spaced arms 12 and 13 respectively parallel and contiguous thereto. The shaft 34 is journaled in bearings 36 and 37 projecting from the arm 12, and the shaft 35 is journaled in bearings 38 and 39 projecting from the arm 13. Handwheels 40 and 41 respectively are keyed upon the corresponding outer ends of said shafts 34 and 35.

A carriage bracket 42 is threadably engaged upon the shaft 34 and depends below the arm 12 towards the table 14. A similar carriage bracket 43 is engaged upon the shaft 35 and projects above the arm 13 towards the table 14. Shafts 44 and 45 respectively are journaled in said brackets 42 and 43. A carrier wheel 46 is rotatably mounted upon the shaft 44 and a second carrier wheel 47 is rotatably mounted upon the shaft 45. Since the wheels 46 and 47 are mounted upon their respective shafts in the same vertical plane as the drive wheel 33 (see Figure 2) an endless saw band 48 extended over the peripheries of said wheels 46, 47 and 33 may be retained thereon when power is applied to the drive wheel 33.

The rotation of the handwheel 40 will translate the bracket 42 and its depending carrier wheel 46 along the arm 12. Similarly, rotation of the handwheel 41 will translate the bracket 43 and its projecting carrier wheel 47 along the arm 13. Examples of two positions which may be taken by said wheels 46 and 47 are indicated in broken lines at 46a and 47a, and 46b and 47b respectively, in Figure 3. The horizontal displacement of the carrier wheels 46 and 47 relative to each other inclines the cutting reach 49 of the saw band 48 at an angle to the table 14, the size of said angle varying inversely as a tangential function of said horizontal displacement. Set screws 50 and 51 respectively are provided in the brackets 42 and 43 for securing said brackets in place upon the arms 12 and 13.

The arms 12 and 13 are graduated in equal and corresponding increments, and pointers 52, 53, 54 and 55 are provided upon the brackets 42 and 43 to indicate their position along said arms 12 and 13. Since the vertical distance between the centers of the wheels 46 and 47 is constant, the difference in scale readings between the pointers 52 and 54 or between the pointers 53 and 55 is a direct measure of the angle the cutting reach 49 is inclined from the horizontal. With the aid of a table of trigonometric functions, the cutting reach angles resulting from various horizontal spacings of the brackets 42 and 43 may be computed and tabulated and this tabulation may be posted (as illustrated at 56 in Figure 1) upon the machine 4 for the convenient reference of the operator.

The work table 14 is formed with an elongated, lateral slot 57 to permit the passage of the saw band 48. Immediately above the work table 14, the band 48 is embraced within a guide slot 58 formed in a lug 59 projecting from the foot 60. A small, rotatable wheel 61 also projects from the foot 60. This wheel 61 backs the band 48 when work is pressed into the saw teeth. The foot 60 also serves to keep the work down upon the table 14. The screw 62 pivots the foot 60 in the longitudinal slot 63 of the strap 64. The strap 64 in turn is pivoted upon the bracket 42 at 65. The upper end of the strap 64 carries a screw 66 which rides in the arcuate slot 67 formed in the plate 68 welded to the bracket 42. A wing nut 69 is provided upon the screw 66 to clamp the strap 64 in position parallel to that of the cutting reach 49.

In order to adjust the angle of inclination of the cutting reach 49 the operator first slackens the saw bank 48 by loosening the set screw 25, rotating the handwheel 24 and translating the drivewheel 33 towards the table 14. The wing nut 69 is then rotated to permit the strap 64 to swing freely on its pivot 65. The operator then refers to the table 56 and selects the relative displacement of the brackets 42 and 43 to produce the angle of inclination he desires. Set screws 50 and 51 are loosened and the handwheels 40 and 41 are rotated until the brackets 42 and 43 are horizontally spaced as the operator desires. The set screws 50 and 51 are then tightened. The slack in the band 48 is taken up by rotating the handwheel 24 to translate the drive wheel 33 away from the table 14 and the screw 25 is reset. The strap 64 is adjusted to accommodate itself to the new angle of the cutting reach 49, the wing nut 69 is tightened and the machine is ready for work.

Now should the piece of work be small and the specifications require a cut near an edge of said work, it is apparent that said edge may be guided against the vertical strut 9 and that the cutting reach 49 of the saw band 48 may be horizontally spaced near said strut. The carriage brackets 42 and 43, in such case, may both be translated towards the drive wheel 32 to position the cutting reach 50 close to the strut 9. The length of the saw band 48 required by the relative positions of the carrier wheels 46 and 47 and the drive wheel 33 is thus substantially decreased, and a shorter, less expensive band may be mounted over said wheels. Since a great many pieces of work must frequently be cut to the same specifications and a number of bands may be broken before said work is completed, the substitution of a shorter band results in considerable economy of operation. Thus, my invention possesses a great advantage over previous band-saws which are limited in the size and specifications of work they can accommodate and in the length of saw band they must employ to process said work.

I have covered the working parts of my machine 4 with the cabinet 70 shown in Figure 1 for reasons of safety and appearance. The cabinet 70 includes a plurality of doors 71, 72 and 73 for ready access to the working parts. The triangular arrangement of the wheels 33, 46 and 47 provides the deep-throated construction shown, which permits handling large pieces of work. This triangular arrangement with the large wheel 33 at the apex of the triangle also minimizes the curvature required of the saw band 48, and is an important factor in decreasing the occurrence of band breakage. However, to provide for safety in the event of a breakage, I prefer to drive my saw so that the band 48 moves downward into the work table 14. Most breaks will occur in the portion of the band 48 immediately above the table 14. Thus, if the band 48 is moving into the table 14 at the time of a break, the impetus of the band will carry the broken end into the housed portion below the table 14 where said broken end cannot injure the operator. In the event of a break in the band anywhere else than in that portion immediately before the work table, the operator is protected by the almost complete enclosure of the cabinet 70. As a matter of fact, the only working part of my sawing machine which is exposed is the short strip of saw band immediately above the table 14, and the foot 60 partially obstructs access even to said small exposed strip.

My sawing machine is very compact and can be accommodated in much less space than conventional arrangements employing only two vertically spaced guide wheels. My machine maintains the work at a convenient arm height for the operator and said operator does not have to juggle said work on a tilted table to make an angled kerf. The operator can accurately adjust the machine to produce the exact angle of kerf he desires with a minimum of movement and exertion. He may set the machine to employ the shortest, and consequently the most economical, length of saw band which the specifications of the work will permit. The tension of the saw band is also quickly and easily regulated. My machine is designed for the utmost simplicity of operation and adjustment, and consequently the operator thereof is enabled to produce a maximum amount of work per unit of time spent at such machines.

While I have described my invention as embodied in a specific form and as operating in a specific manner for the purposes of illustration, it should be understood that I do not limit my invention thereto, since various modifications will suggest themselves to those skilled in the art without departing from the spirit of my invention, the scope of which is set forth in the annexed claim.

I claim:

A band sawing machine consisting of: a frame including a pair of laterally extending, parallel, vertically-spaced arms; a fixed, horizontal, slotted work table supported by said frame between said arms; a pair of horizontal, vertically-spaced guide rods fastened at the ends thereof in said frame to the side of said table; a cross-head slidable upon said guide rods; a first threaded shaft engaged in said frame and in said cross-head for translating the latter relative to the former; a horizontal drive shaft journaled in said cross-head; a vertical drive wheel journaled upon said drive shaft; an electric motor; V-belt and sheave means for transmitting power from said motor to rotate said drive shaft; second and third threaded shafts parallel to said frame arms, each of said shafts being contiguous to one of said frame arms; a pair of carriage brackets respectively threaded upon said second and said third threaded shafts for translation along said frame arms; set screw means for securing the position of each bracket along the frame arm associated therewith; two vertical carrier wheels rotatably supported by said brackets and spaced apart, one over and one under said table; and an endless saw band extended over the peripheries of said carrier wheels and said drive wheel and passing through the slot of said table, the cutting reach of said blade being angularly adjustable with respect to said table by changing the respective positions of said carrier wheels along said frame arms.

VITO A. NARDI.

REFERENCES CITED

The following references are of record in the file of this patent:

UNITED STATES PATENTS

| Number | Name | Date |
|---|---|---|
| 85,894 | Atkinson | Jan. 19, 1869 |
| 833,538 | Mershon | Oct. 16, 1906 |
| 1,416,355 | Johnson | May 16, 1922 |
| 1,608,696 | Hutchinson | Nov. 30, 1926 |

FOREIGN PATENTS

| Number | Country | Date |
|---|---|---|
| 96,798 | Germany | Apr. 16, 1898 |
| 317,214 | Italy | Apr. 27, 1934 |